US009453720B2

(12) United States Patent
Hunt et al.

(10) Patent No.: US 9,453,720 B2
(45) Date of Patent: Sep. 27, 2016

(54) METROLOGY SYSTEM FOR GENERATING MEASUREMENTS OF FUSELAGE SECTIONS

(71) Applicant: The Boeing Company, Chicago, IL (US)

(72) Inventors: Jeffrey H. Hunt, Thousand Oaks, CA (US); Stephen A. Walls, Everett, WA (US); David Arthur Whelan, Newport Coast, CA (US); Jonathan M. Saint Clair, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/489,057

(22) Filed: Sep. 17, 2014

(65) Prior Publication Data

US 2016/0076879 A1    Mar. 17, 2016

(51) Int. Cl.
*G01B 11/24* (2006.01)
*B64C 1/06* (2006.01)
*B64F 5/00* (2006.01)

(52) U.S. Cl.
CPC ............... *G01B 11/24* (2013.01); *B64C 1/069* (2013.01); *B64F 5/0009* (2013.01)

(58) Field of Classification Search
CPC .. B64F 5/0009; B64F 1/068; B23P 2700/01; Y10T 29/49622; Y10T 29/49764; Y10T 29/49771; Y10T 29/49778; Y10T 29/4978; Y10T 29/49895; Y10T 29/53978; Y10T 29/53991; B23B 2215/04; B23B 49/026; B64C 1/068
USPC .................................................. 356/601–640
See application file for complete search history.

(56) References Cited

U.S. PATENT DOCUMENTS

| 5,371,587 | A | 12/1994 | de Groot et al. |
| 7,215,413 | B2 | 5/2007 | Soreide et al. |
| 7,307,700 | B1 | 12/2007 | Leep et al. |
| 7,430,070 | B2 | 9/2008 | Soreide et al. |
| 7,701,592 | B2 | 4/2010 | Saint Clair et al. |
| 7,903,261 | B2 | 3/2011 | Saint Clair et al. |
| 2010/0135754 | A1 | 6/2010 | Weber |
| 2012/0130528 | A1 | 5/2012 | Stark et al. |

FOREIGN PATENT DOCUMENTS

EP    2756934 A1    7/2014

OTHER PUBLICATIONS

Hunt et al., "Fuselage Manufacturing System," U.S. Appl. No. 14/488,984, filed Sep. 17, 2014, 64 pages.
Hunt et al., "Cradle System for Shaping Fuselage Sections," U.S. Appl. No. 14/489,101, filed Sep. 17, 2014, 62 pages.
Hunt et al., "Fuselage Manufacturing System," U.S. Appl. No. 14/717,272, filed May 20, 2015, 94 pages.
Extended European Search Report, dated Jan. 29, 2016, regarding Application No. EP15182797.9, 8 pages.

*Primary Examiner* — Tri T Ton
(74) *Attorney, Agent, or Firm* — Yee & Associates, P.C.

(57) ABSTRACT

A method and apparatus for processing fuselage sections. A scanning system is positioned between a first fuselage section held in a first cradle and a second fuselage section held in a second cradle. A group of beams of light is transmitted from the scanning system to targets on a first interior surface of the first fuselage section and a second interior surface of the second fuselage section. A reflected light is detected from a beam of light. Measurements of the first fuselage section and the second fuselage section are generated from using the reflected light generated in response to the beam of light. The measurements enable shaping at least one of the first fuselage section and the second fuselage section for joining the first fuselage section to the second fuselage section.

20 Claims, 15 Drawing Sheets

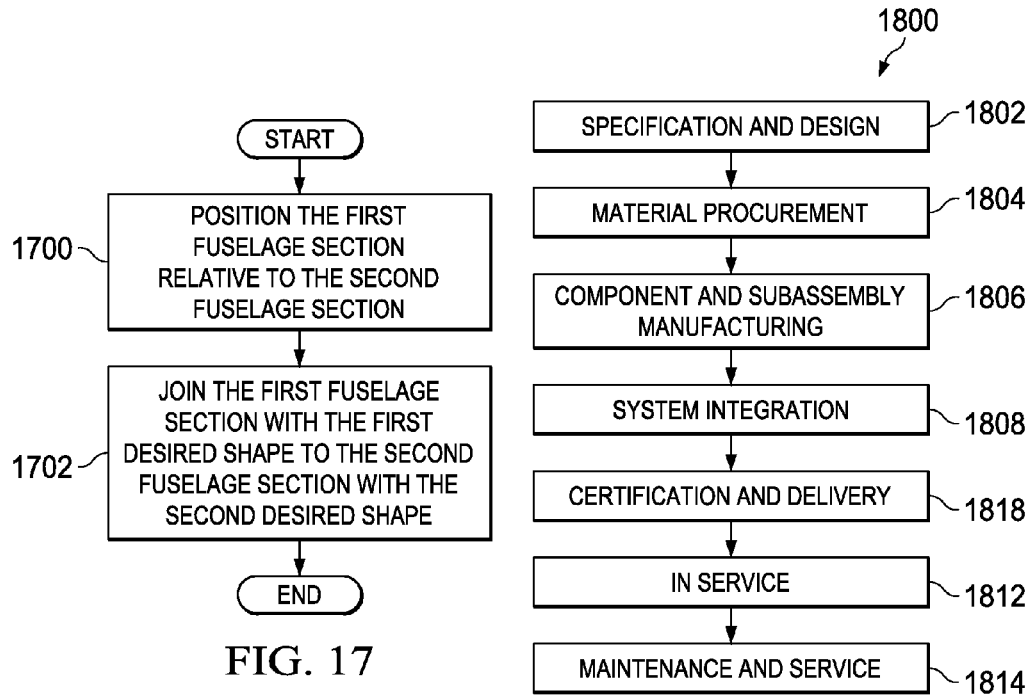
FIG. 17
FIG. 18
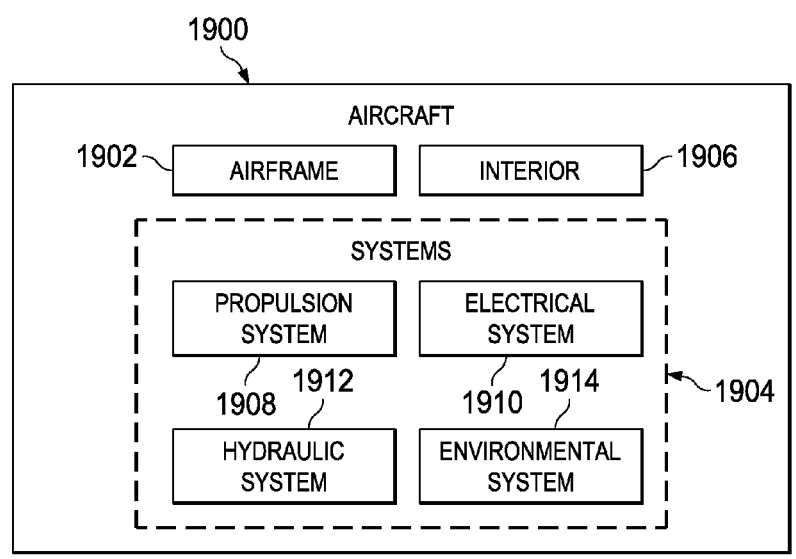
FIG. 19

METROLOGY SYSTEM FOR GENERATING MEASUREMENTS OF FUSELAGE SECTIONS

CROSS-REFERENCE TO RELATED APPLICATIONS

This application is related to the following patent applications: application Ser. No. 14/488,984, entitled "Fuselage Manufacturing System", and application Ser. No. 14/489,101, entitled "Cradle System for Shaping Fuselage Sections," filed even date hereof and assigned to the same assignee. Each of the aforementioned applications is incorporated herein by reference in its entirety.

BACKGROUND INFORMATION

1. Field

The present disclosure relates generally to manufacturing objects and, in particular, to manufacturing aircraft. Still more particularly, the present disclosure relates to a method and apparatus for joining composite fuselage sections to each other.

2. Background

Aircraft are being designed and manufactured with greater and greater percentages of composite materials. Composite materials are used in aircraft to decrease the weight of the aircraft. This decreased weight improves performance features such as payload capacities and fuel efficiencies. Further, composite materials provide longer service life for various components in an aircraft.

Composite materials are tough, light-weight materials created by combining two or more functional components. For example, a composite material may include reinforcing fibers bound in polymer resin matrix. The fibers may be unidirectional or may take the form of a woven cloth or fabric. The fibers and resins are arranged and cured to form a composite material.

Further, using composite materials to create aerospace composite structures potentially allows for portions of an aircraft to be manufactured in larger pieces or sections. For example, a fuselage in an aircraft may be created in cylindrical sections and then assembled to form the fuselage of the aircraft. Other examples include, without limitation, wing sections joined to form a wing, or stabilizer sections joined to form a stabilizer.

With fuselage sections that are cylindrical, the dimensions of the fuselage sections are important to provide a desired fit when joining these sections to each other to form the fuselage of the aircraft. For example, the ends of two fuselage sections are joined to form part of the fuselage of the aircraft. The shape of these ends should match as closely as possible.

A difference in the shapes of the ends may result in an undesired fit. Differences in the shapes of the ends may result from different causes. For example, variations from design specification in manufacturing the fuselage sections may cause an undesired shape at the ends. The fuselage sections are large enough that gravity may cause deformation that changes the shape of the fuselage sections such that the ends do not have a desired shape to be joined to each other.

This undesired fit may cause the fuselage of the aircraft to perform in a less than desired manner. For example, if the fuselage sections are joined with the undesired shapes, the amount of fuel used may increase from undesired airflow that may occur during flight. Also, undesired airflow may cause increased noise that may reduce pleasantness of the flight experience for passengers.

Currently, operators on the manufacturing floor move ends of the two fuselage sections next to each other for joining. The operators measure the differences in the shape of the ends using tools such as feeler gauges. Changes to the shape of one or both fuselage ends are made using jacks or other tools placed and operated by the operators to push on the fuselage sections to change the shape of one or both of the fuselage sections.

The currently used process for joining the fuselage sections is time consuming and labor intensive. Additionally, the shapes of the two fuselage sections may be close but may still not have a desired level of fit between them.

Therefore, it would be desirable to have a method and apparatus that take into account at least some of the issues discussed above, as well as other possible issues. For example, it would be advantageous to have a method and apparatus for joining fuselage sections for an aircraft with a desired level of fit.

SUMMARY

In one illustrative embodiment, a method for measuring fuselage sections is provided. A scanning system is positioned between a first fuselage section held in a first cradle and a second fuselage section held in a second cradle. A group of beams of light is transmitted from the scanning system to targets on a first interior surface of the first fuselage section and a second interior surface of the second fuselage section. A reflected light is detected from a beam of light. Measurements of the first fuselage section and the second fuselage section are generated from using the reflected light generated in response to the beam of light. The measurements enable shaping at least one of the first fuselage section and the second fuselage section for joining the first fuselage section to the second fuselage section.

In another illustrative embodiment, another method for measuring fuselage sections is provided. A scanning system is positioned between a first fuselage section held in a first cradle and a second fuselage section held in a second cradle. Measurements of the first fuselage section and the second fuselage section are generated using the scanning system. The measurements enable shaping at least one of the first fuselage section and the second fuselage section for joining the first fuselage section to the second fuselage section.

In yet another illustrative embodiment, a metrology system for measuring fuselage sections is provided. The metrology system comprises a scanner that transmits a group of beams of light from the scanning system to targets on a first interior surface of a first fuselage section and a second interior surface of a second fuselage section. The scanner further detects a reflected light from the beam of light and generates measurements of the first fuselage section and the second fuselage section from using the reflected light generated in response to the beam of light. The measurements enable shaping at least one of the first fuselage section and the second fuselage section for joining the first fuselage section to the second fuselage section.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 17 is an illustration of a flowchart of a process for joining fuselage sections in accordance with an illustrative embodiment;

FIG. 18 is an illustration of an aircraft manufacturing and service method in the form of a block diagram in accordance with an illustrative embodiment; and FIG. 19 is an illustration of an aircraft in the form of a block diagram in which an illustrative embodiment may be implemented.

DETAILED DESCRIPTION

Figure 1:
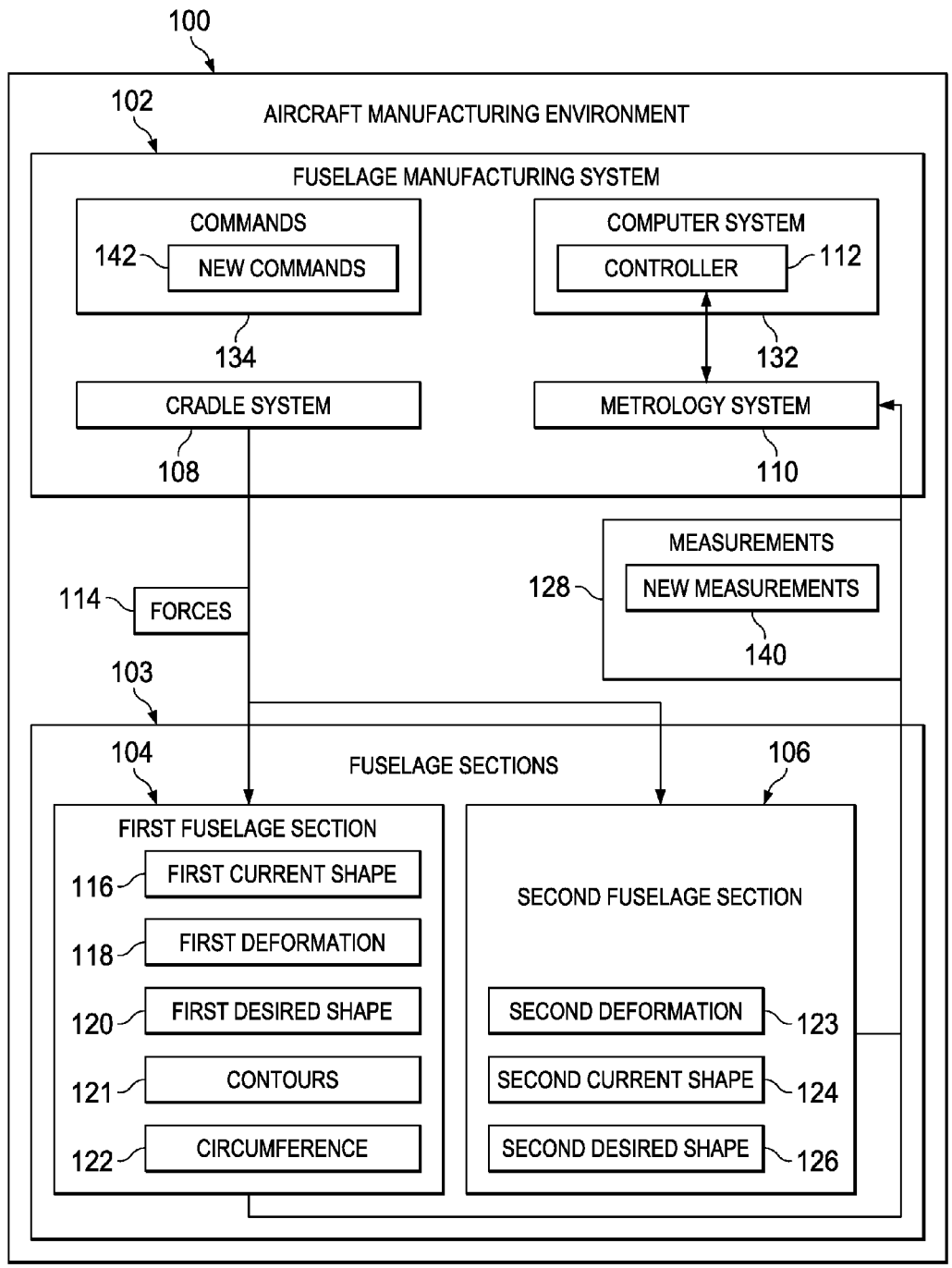
FIG. 1 is an illustration of a block diagram of an aircraft manufacturing environment in accordance with an illustrative embodiment.

With reference now to the figures, and in particular, with reference to FIG. 1, an illustration of a block diagram of an aircraft manufacturing environment is depicted in accordance with an illustrative embodiment. In this example, aircraft manufacturing environment 100 includes fuselage manufacturing system 102, which is used to join fuselage sections 103 to each other as part of manufacturing an aircraft.

In this illustrate example, fuselage manufacturing system 102 joins first fuselage section 104 to second fuselage section 106 in fuselage sections 103 using a number of components. As depicted, components in fuselage manufacturing system 102 include cradle system 108, metrology system 110, and controller 112.

Cradle system 108 is a physical apparatus. As depicted, cradle system 108 holds first fuselage section 104 and applies forces 114 to first fuselage section 104 to change first current shape 116 of first fuselage section 104.

The application of forces 114 by cradle system 108 to first fuselage section 104 causes first deformation 118 to first fuselage section 104. Forces 114 may be applied in a manner that causes first deformation 118 such that first current shape 116 of first fuselage section 104 changes towards first desired shape 120 for first fuselage section 104.

In this illustrative example, first current shape 116 and first desired shape 120 are contours 121 for first fuselage section 104. In particular, the contours are those around circumference 122 of first fuselage section 104.

Additionally, a portion of forces 114 generated by cradle system 108 also may be applied to second fuselage section 106. Cradle system 108 applies forces 114 in a manner that causes second deformation 123. As a result, second current shape 124 of second fuselage section 106 has second deformation 123 and second current shape 124 changes towards second desired shape 126 for second fuselage section 106.

In other words, cradle system 108 may apply forces 114 to change at least one of first current shape 116 of first fuselage section 104 towards first desired shape 120 or second current shape 124 of second fuselage section 106 towards second desired shape 126. As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, metrology system 110 is a hardware sensor system. Metrology system 110 makes measurements 128 of fuselage sections 103. As depicted, measurements 128 are made without contact or touching fuselage sections 103.

For example, metrology system 110 makes measurements 128 of first current shape 116 of first fuselage section 104. Metrology system 110 also may make measurements 128 of second current shape 124 of second fuselage section 106.

In the illustrative example, controller 112 controls operation of cradle system 108 and metrology system 110. Controller 112 may be implemented in software, hardware, firmware or a combination thereof. When software is used, the operations performed by controller 112 may be implemented in program code configured to run on hardware, such as a processor unit. When firmware is used, the operations performed by controller 112 may be implemented in program code and data and stored in persistent memory to run on a processor unit. When hardware is employed, the hardware may include circuits that operate to perform the operations in controller 112.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In this illustrative example, controller 112 is located in computer system 132. Computer system 132 includes one or more data processing systems. When more than one data processing system is present, those data processing systems may be in communication with each other using a communications medium such as a network. The data processing systems may be selected from at least one of a computer, a server computer, a tablet, a mobile phone, or some other suitable data processing system.

As depicted in this illustrative example, controller 112 receives measurements 128 from metrology system 110. Controller 112 identifies forces 114 needed to change first current shape 116 of first fuselage section 104 to first desired shape 120 for connecting first fuselage section 104 to second fuselage section 106. Controller 112 then sends commands 134 to cradle system 108 to apply forces 114 to change first current shape 116 of first fuselage section 104 towards first desired shape 120.

When forces 114 are applied to first fuselage section 104, the change in first current shape 116 may not result in first desired shape 120. Instead, first current shape 116 may be closer to first desired shape 120 but not quite reaching first desired shape 120.

In this case, measurements 128 may be made again by metrology system 110. In this illustrative example, measurements 128 are new measurements 140 made by metrology system 110 after cradle system 108 applies forces 114 to first fuselage section 104 to change first current shape 116 of first fuselage section 104 towards first desired shape 120.

Controller 112 uses new measurements 140 as a feedback to identify forces 114 needed to change first current shape 116 of first fuselage section 104 further towards first desired shape 120 if first desired shape 120 has not been reached. Controller 112 sends commands 134 in the form of new commands 142 to cradle system 108 to apply forces 114 to change first current shape 116 of first fuselage section 104 towards first desired shape 126.

Further, measurements 128 from metrology system 110 may include measurements for second fuselage section 106. In this particular example, controller 112 identifies forces 114 needed to change second current shape 124 of second fuselage section 106 towards second desired shape 126 for connecting first fuselage section 104 to second fuselage section 106. Controller 112 then sends commands 134 to cradle system 108 causing cradle system 108 to apply forces 114 to change second current shape 124 of second fuselage section 106 towards second desired shape 126.

In the illustrative example, first desired shape 120 is based on at least one of second current shape 124 of second fuselage section 106, a model of first fuselage section 104, parameters specified by a design for first fuselage section 104, or some other standard or specification. For example, first desired shape 120 for first fuselage section 104 may be second current shape 124 for second fuselage section 106. In another example, second desired shape 126 for second fuselage section 106 may be first current shape 116 for first fuselage section 104.

In this manner, fuselage sections 103 may be joined to each other in a desired manner more efficiently than with currently used techniques. With fuselage manufacturing system 102, the amount of time and labor needed to join fuselage sections 103 to each other may be reduced. Further, a desired level of fit between first fuselage section 104 and second fuselage section 106 may be achieved with less effort or time. In this manner, the time and expense needed to manufacture a fuselage may be reduced as well as provide for a desired level of fit between fuselage sections 103.

Figure 2:
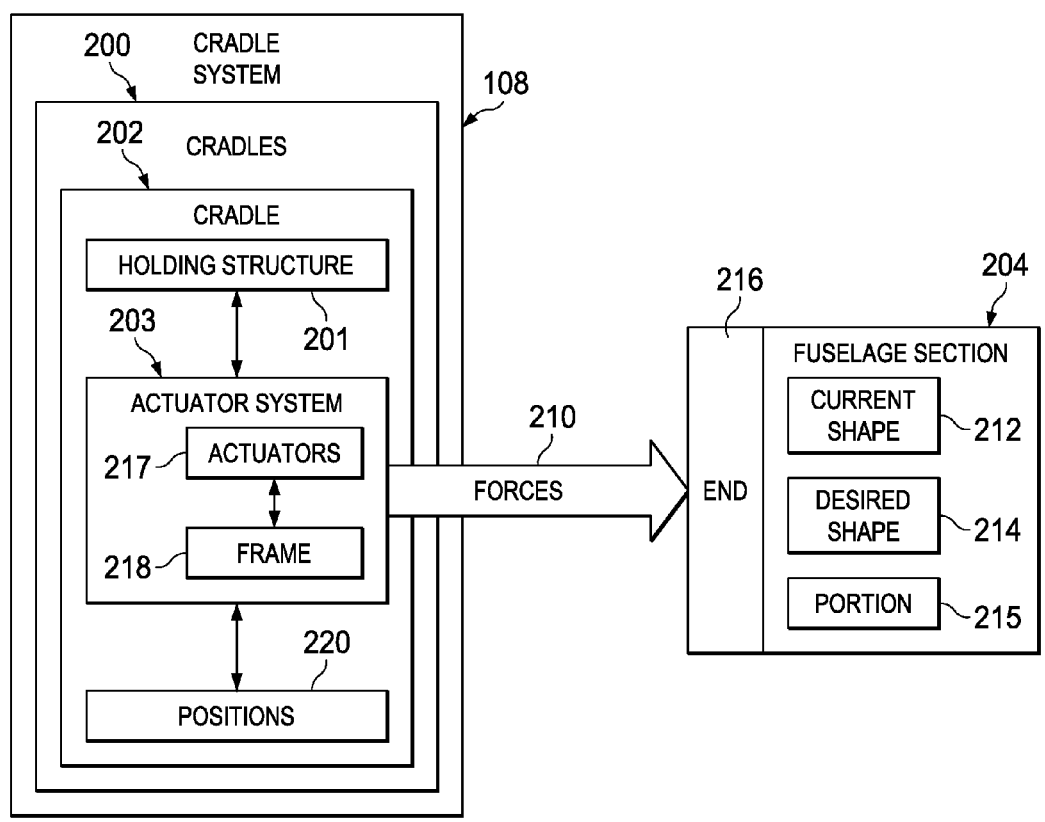
FIG. 2 is an illustration of a block diagram of a cradle system in accordance with an illustrative embodiment.

With reference next to FIG. 2, an illustration of a block diagram of a cradle system is depicted in accordance with an illustrative embodiment. As depicted, an example of an implementation for cradle system 108 in FIG. 1 is depicted. In this illustrative example, cradle system 108 includes a group of cradles 200. As used herein, a "group of," when used with reference items means one or more items. For example, a group of cradles 200 is one or more of cradles 200.

In this example, cradle 202 in the group of cradles 200 includes a number of components. As depicted, holding structure 201 and actuator system 203 are components that form cradle 202. As depicted, cradle 202 is mobile. In other words, cradle 202 is configured to move within aircraft manufacturing environment 100 in FIG. 1. For example, cradle 202 may be movable by a human operator, a vehicle, or may include a movement system.

Holding structure 201 holds fuselage section 204. Fuselage section 204 is an example of a fuselage section in fuselage sections 103 in FIG. 1. In this illustrative example, actuator system 203 applies forces 210 to fuselage section 204 while fuselage section 204 is held in holding structure 201. Forces 210 change current shape 212 of fuselage section 204 towards desired shape 214 when commands 134 are received from controller 112 in FIG. 1.

In the depicted example, actuator system 203 may apply forces 210 to portion 215 of fuselage section 204 to change current shape 212 of fuselage section 204. Portion 215 may be some or all of fuselage section 204 depending on the particular implementation. For example, portion 215 may be about one half of a circumference of the fuselage section. As another example, actuator system 203 applies forces 210 to portion 215 of fuselage section 204 located at end 216 of fuselage section 204.

As depicted, actuator system 203 is formed from a number of different components. As depicted, components in actuator system 203 include actuators 217 and frame 218.

In this illustrative example, actuators 217 may be implemented using one or more different types of actuators. For example, actuators 217 may be selected from at least one of a linear actuator, a hydraulic actuator, a pneumatic actuator, an electro mechanical actuator, or some other suitable type of actuator.

As depicted, frame 218 is a structure that holds actuators 217. In particular, actuators 217 are physically associated with frame 218. When one component is "associated" with another component, the association is a physical association in the depicted examples. For example, a first component may be considered to be physically associated with a second component by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, extension of the second component, or both.

In this illustrative example, frame 218 holds actuators 217 in positions 220 around fuselage section 204 when fuselage section 204 is held in holding structure 201 in cradle 202. For example, frame 218 may hold actuators 217 such that actuators 217 are positioned at end 216 of fuselage section 204 held in holding structure 201.

Figure 3:
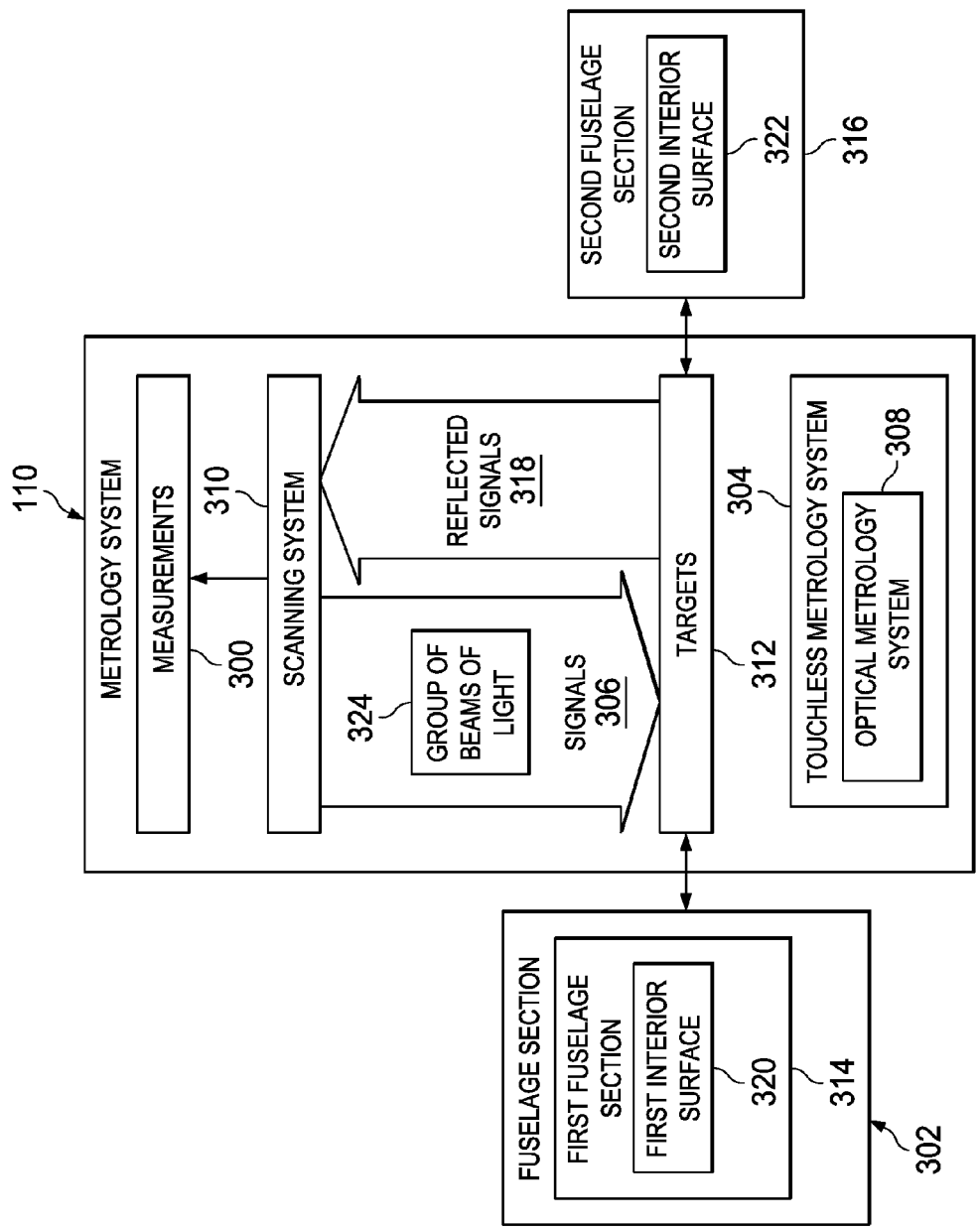
FIG. 3 is an illustration of a block diagram of a metrology system in accordance with an illustrative embodiment.

With reference next to FIG. 3, an illustration of a block diagram of a metrology system is depicted in accordance with an illustrative embodiment. As depicted, an example of an implementation for metrology system 110 in FIG. 1 is depicted.

In this illustrative example, metrology system 110 makes measurements 300 of fuselage section 302. Fuselage section 302 is an example of a fuselage section in fuselage sections 103 in FIG. 1. Measurements 300 are examples of measurements 128 in FIG. 1.

As depicted, metrology system 110 is touchless metrology system 304. In other words, metrology system 110 does not require physical contact with fuselage section 302 to generate measurements 300.

Instead, metrology system 110 may use signals 306 to generate measurements 300. As depicted, signals 306 may include at least one of light, infrared signals, radio frequency signals, or other suitable types of signals. In this illustrative example, touchless metrology system 304 takes the form of optical metrology system 308.

Metrology system 110 includes a number of different components. In this particular example, metrology system 110 includes scanning system 310 and targets 312.

As depicted, scanning system 310 transmits signals 306 to generate measurements 300. In this illustrative example, scanning system 310 includes at least one of a lidar system, a laser scanning system, or some other suitable type of device. In other words, one or more of these devices or other suitable devices may be used in any combination in scanning system 310.

Scanning system 310 may be selected such that scanning system 310 may transmit signals 306, detect reflected signals 318, or both in about 360 degrees. The detection may be performed without moving, realigning, or otherwise changing the position of scanning system 310 while transmitting signals 306 or detecting reflected signals 318.

In other words, metrology system 110 with scanning system 310 and targets 312 is self-referencing. In being self-referencing, absolute positioning is not needed to obtain a desired resolution in generating measurements 300. The desired resolution may be obtained without any dependency of an absolute positioning of system scanning system 310, targets 312, or both.

Targets 312 are structures that reflect signals 306. Reflected signals 318 are detected by scanning system 310 and are used to generate measurements 300. Targets 312 may be selected from at least one of reflective tape, a tooling ball, a feature on fuselage section 302, or some other suitable target. In other words, targets 312 may be attached to fuselage section 302, already present as part of fuselage section 302 as manufactured, or some combination thereof.

Using features in fuselage section 302 reduces the time and effort needed to shape and join fuselage section 302 to other structures. For example, attaching and removing targets is unnecessary. Also, inspecting fuselage section 302 for debris, inconsistencies in fuselage section 302 from targets 312 is avoided. The feature may be any structure or portion of fuselage section 302 that reflects signals 306.

In this illustrative example, metrology system 110 may be used to generate measurements of two fuselage sections. For example, fuselage section 302 is first fuselage section 314 and scanning system 310 may be positioned relative to first fuselage section 314 and second fuselage section 316. These two fuselage sections may be held in cradle system 108 in FIG. 1. For example, scanning system 310 may be positioned between first fuselage section 314 and second fuselage section 316.

Targets 312 are located on both first fuselage section 314 and second fuselage section 316 in this illustrative example. In particular, targets 312 may be located on first interior surface 320 of first fuselage section 314 and second interior surface 322 of second fuselage section 316.

Scanning system 310 transmits signals 306 at targets 312 on first fuselage section 314 and second fuselage section 316. Reflected signals 318 from targets 312 are detected by scanning system 310. As depicted, scanning system 310 generates measurements 300 from reflected signals 318 from both first fuselage section 314 and second fuselage section 316. When both first fuselage section 314 and second fuselage section 316 are present instead of just first fuselage section 314, the positioning of scanning system 310 is selected such that scanning system 310 is able to direct signals 306 to targets 312 on both first fuselage section 314 and second fuselage section 316 at substantially the same time.

In the illustrative example, signals 306 may be a group of beams of light 324. In on illustrative example, the group of beams of light 324 may be group of laser beams. If a single laser beam is used, scanning system 310 may use a mirror or other reflector to direct the laser beam to targets 312 on first fuselage section 314 and second fuselage section 316 at substantially the same time.

In the illustrative example, metrology system 110 may operate on its own. In other words, measurements 300 may be made without needed input or changes from a human operator or some other device. Scanning system 310 may receive a program, control file, or other information and operate to perform measurements 300. Measurements 300 may be performed each time metrology system 110 detects an event.

For example, measurements 300 may be performed each time metrology system 110 detects a change in the shape of at least one of first fuselage section 314 or second fuselage section 316. Scanning system 310 may transmit signal continuously or periodically to detect when the shape of at least one of first fuselage section 314 or second fuselage section 316 changes.

Figure 4:
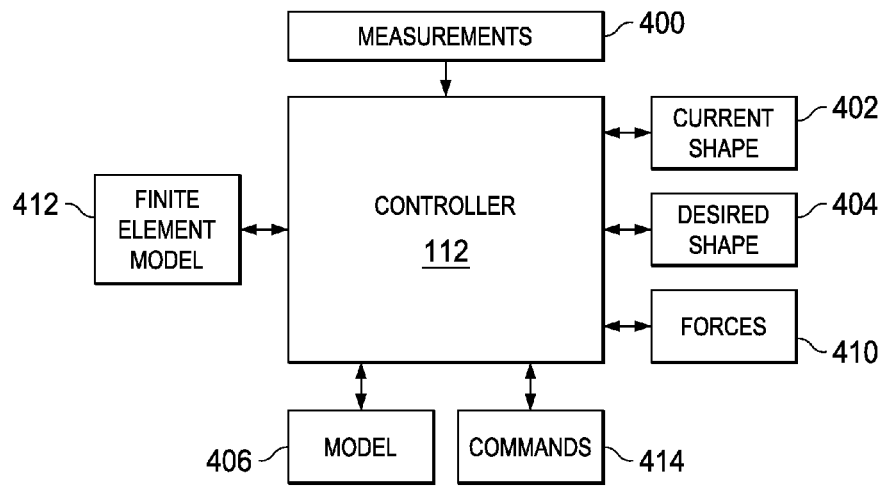
FIG. 4 is an illustration of a block diagram of data flow for identifying forces to be applied to a fuselage section in accordance with an illustrative embodiment.

With reference to FIG. 4, an illustration of a block diagram of data flow for identifying forces to be applied to a fuselage section is depicted in accordance with an illustrative embodiment. In this depicted example, controller 112 identifies forces 114 to be applied to a fuselage section, such as first fuselage section 104 shown in FIG. 1.

As depicted, controller 112 receives measurements 400 for a fuselage section. Measurements 400 is an example of measurements 128 in FIG. 1. Controller 112 uses measurements 400 to identify current shape 402 for a fuselage section. Controller 112 then identifies desired shape 404.

In these illustrative examples, desired shape 404 may be identified from model 406. Model 406 may be a model of the fuselage section with the desired dimensions. In this illustrative example, model 406 is a computer-aided design model. In another illustrative example, desired shape 404 may be identified from current shape 402 for a second fuselage section to which the fuselage section being processed is to be joined.

The process then identifies forces 410 to be applied to the fuselage section. These forces may be identified using a number of different techniques. For example, finite element model 412 for the fuselage section may be used to identify how different forces affect current shape 402 for the fuselage section being processed. Based on the identification of forces 410, controller 112 generates commands 414 that are sent to a cradle holding the fuselage section to apply forces 410 as identified by controller 112.

Figure 5:
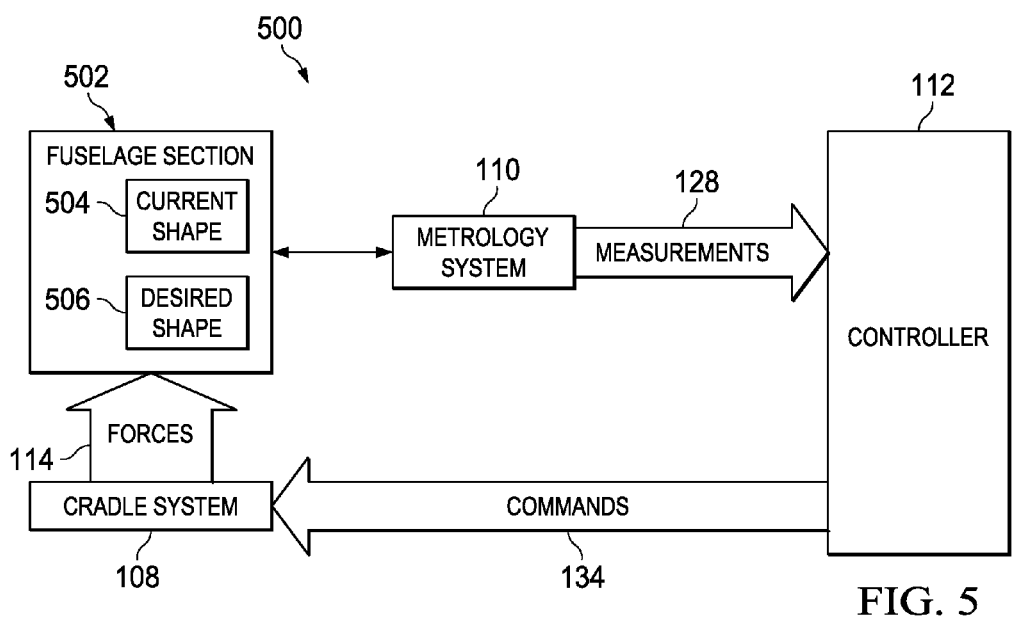
FIG. 5 is an illustration of a feedback loop in accordance with an illustrative embodiment.

With reference now to FIG. 5, an illustration of a feedback loop is depicted in accordance with an illustrative embodiment. In this depicted example, feedback loop 500 is formed by cradle system 108, metrology system 110 and controller 112.

As depicted, metrology system 110 generates measurements 128 of fuselage section 502 held in cradle system 108. In this illustrative example, fuselage section 502 is a fuselage section in fuselage sections 103 in FIG. 1.

Measurements 128 are sent by metrology system 110 to controller 112. In turn, controller 112 uses measurements 128 to identify forces 114. Forces 114 are ones that should be applied to fuselage section 502 to change current shape 504 of fuselage section 502 towards desired shape 506 for fuselage section 502.

In the illustrative example, controller 112 generates commands 134 and sends commands 134 to cradle system 108. In turn, cradle system 108 applies forces 114 to fuselage section 502. Changing current shape 504 of fuselage section 502 towards desired shape 506 may mean that current shape 504 may reach desired shape 506 or that current shape 504 is closer to but does not reach desired shape 506 in the illustrative examples.

Metrology system 110 again generates measurements 128 after forces 114 have been applied. Measurements 128 are sent to controller 112 to form feedback loop 500. Feedback loop 500 is a closed loop that allows for incremental changes in current shape 504 in reaching desired shape 506.

In some cases, current shape 504 may reach desired shape 506 after the first application of forces 114 to fuselage section 502. In these cases, additional applications of forces 114 may be performed using feedback loop 500 until desired shape 506 has been reached.

In this illustrative example, measurements 128 is a measurement of current shape 504. Controller 112 compares measurements 128 for current shape 504 to parameters for desired shape 506 in determining whether forces 114 should be applied to fuselage section 502. In other illustrative examples, measurements 128 may be, for example, a difference between current shape 504 and desired shape 506 for fuselage section 502.

The illustration of aircraft manufacturing environment 100 and the different components in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, at least one of metrology system 110 or controller 112 identifies a difference between first current shape 116 of first fuselage section 104 and first desired shape 120 for first fuselage section 104. In yet another illustrative example, other numbers of fuselage sections may be processed in cradle system 108 in addition to or in place of first fuselage section 104 and second fuselage section 106. For example, one, three, six, or some other number of fuselage sections 103 may be held and shaped in cradle system 108 with forces 114 applied to change the current shapes of one or more of fuselage sections 103 held in cradle system 108.

Figure 6:
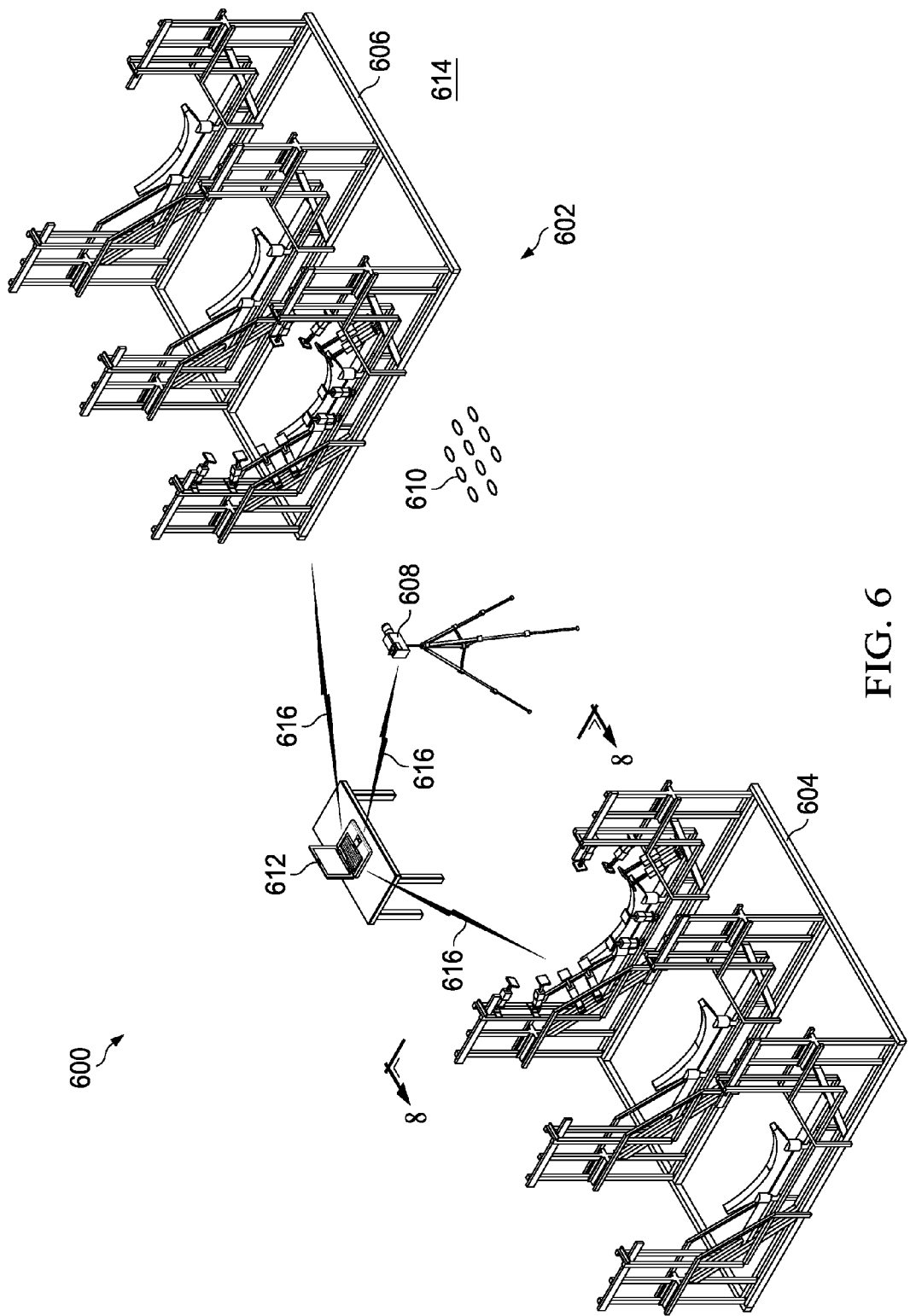
FIG. 6 is an illustration of an aircraft manufacturing environment in accordance with an illustrative embodiment.

With reference now to FIG. 6, an illustration of an aircraft manufacturing environment is depicted in accordance with an illustrative embodiment. Aircraft manufacturing environment 600 is an example of one physical implementation of aircraft manufacturing environment 100 shown in block form in FIG. 1.

In this illustrative example, fuselage manufacturing system 602 in aircraft manufacturing environment 600 includes a number of different components. As depicted, the components in aircraft manufacturing environment 600 include first cradle 604, second cradle 606, laser tracker 608, targets 610, and computer 612. These components are examples of physical components for components shown in block form in fuselage manufacturing system 102 in FIG. 1-4.

First cradle 604 and second cradle 606 form a cradle system in this illustrative example. First cradle 604 and second cradle 606 are examples of physical implementations for cradles 200 in cradle system 108 shown in block form in FIG. 2.

Laser tracker 608 and targets 610 are part of a metrology system. Laser tracker 608 is an example of a physical implementation for scanning system 310 in metrology system 110 as shown in FIG. 3.

In this illustrative example, targets 610 are located on floor 614 of aircraft manufacturing environment 600. Targets 610 may be placed on fuselage sections or other structures (not shown) and used by laser tracker 608 generating measurements. As depicted, targets 610 are examples of physical implementations for targets 312 shown in block form in FIG. 3.

Computer 612 is a controller for fuselage manufacturing system 602. Computer 612 is an example of a physical implementation for controller 112 in FIG. 1. In particular, computer 612 may be used to implement a computer in computer system 132 shown in block form in FIG. 1.

As depicted, computer 612 is in communication with first cradle 604, second cradle 606, and laser tracker 608. In this particular example, the communication between these components occurs through a communications medium that includes the use of wireless signals 616.

Figure 7:
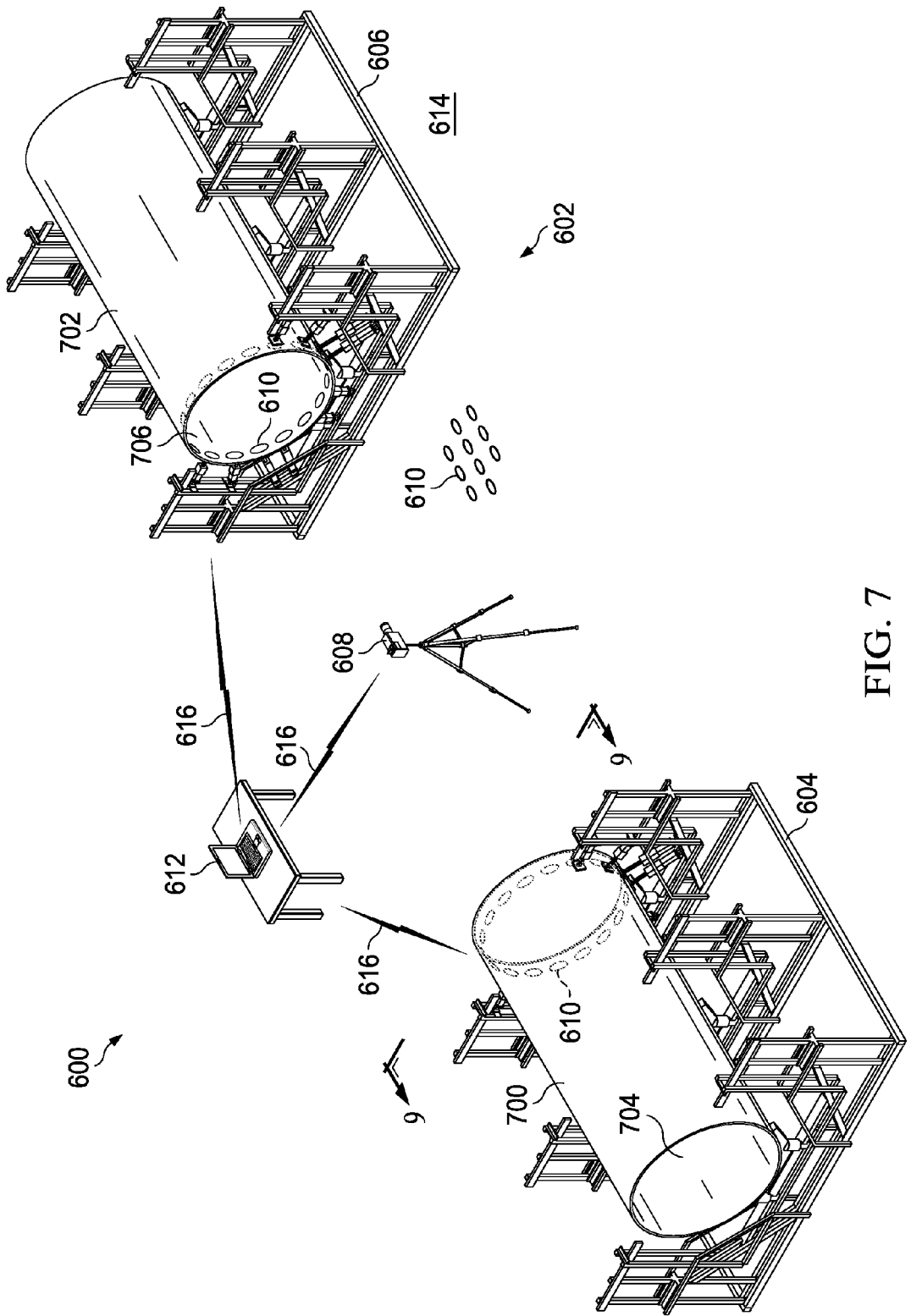
FIG. 7 is an illustration of fuselage sections in a fuselage manufacturing system in accordance with an illustrative embodiment.

Turning next to FIG. 7, an illustration of fuselage sections in a fuselage manufacturing system is depicted in accordance with an illustrative embodiment. In this illustrative example, first fuselage section 700 is shown as being held in first cradle 604. Second fuselage section 702 is depicted as being held in second cradle 606. First fuselage section 700 is an example of a physical implementation for first fuselage section 104 shown in block form in FIG. 1. Second fuselage section 702 is an example of a physical implementation for second fuselage section 106 shown in block form in FIG. 1. In this illustrative example, first cradle 604 and second cradle 606 may actively change the shapes of first fuselage section 700 and second fuselage section 702, respectively.

As depicted, targets 610 may be placed onto at least one of interior surface 704 of first fuselage section 700 or interior surface 706 of second fuselage section 702. Targets 610 are seen in phantom on interior surface 704 of first fuselage section 700 in this view.

Targets 610 are used by laser tracker 608 to generate measurements for the current shape of at least one of first fuselage section 700 or second fuselage section 702. These measurements may be, for example, at least one of the current shape of first fuselage section 700, the current shape of second fuselage section 702, a difference between the current shape and a desired shape of first fuselage section 700, or a difference between the current shape and a desired shape of second fuselage section 702, or some other standard or parameters that define the desired shape for first fuselage section 700.

As depicted, these measurements are used by computer 612 to identify forces needed to change the current shapes of first fuselage section 700, second fuselage section 702, or both towards a desired shape for those fuselage sections. Computer 612 sends commands to at least one of first cradle 604 or second cradle 606 to apply forces to at least one of first fuselage section 700 or second fuselage section 702.

Figure 8:
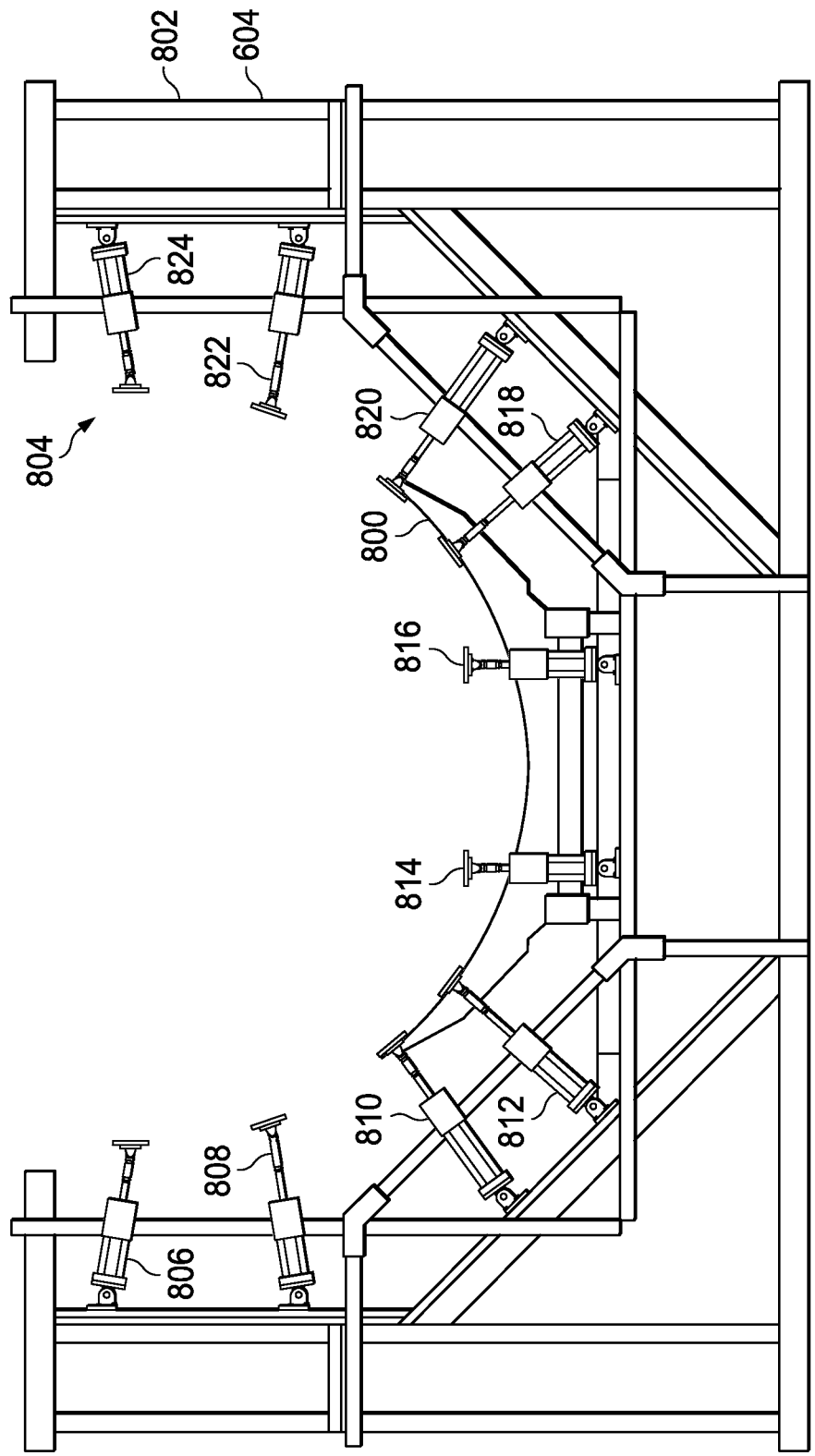
FIG. 8 is an illustration of a cradle in accordance with an illustrative embodiment.

With reference now to FIG. 8, an illustration of a cradle is depicted in accordance with an illustrative embodiment. An end view of first cradle 604 is shown in the direction of arrows 8-8 in FIG. 6.

In this view, first cradle 604 has a number of components. As depicted, these components include holding structure 800, frame 802, and actuators 804.

Holding structure 800 has a design for holding a fuselage section while forces are applied to the fuselage section. Holding structure 800 holds the fuselage section while measurements of the current shape of the fuselage section are made. Holding structure 800 also may be used to position the fuselage section to be joined with another fuselage section. In this illustrative example, the positioning may be performed by moving first cradle 604.

Frame 802 and actuators 804 form an actuator system. As show in this example, actuators 804 includes actuator 806, actuator 808, actuator 810, actuator 812 actuator 814, actuator 816, actuator 818, actuator 820, actuator 822, and actuator 824.

Figure 9:
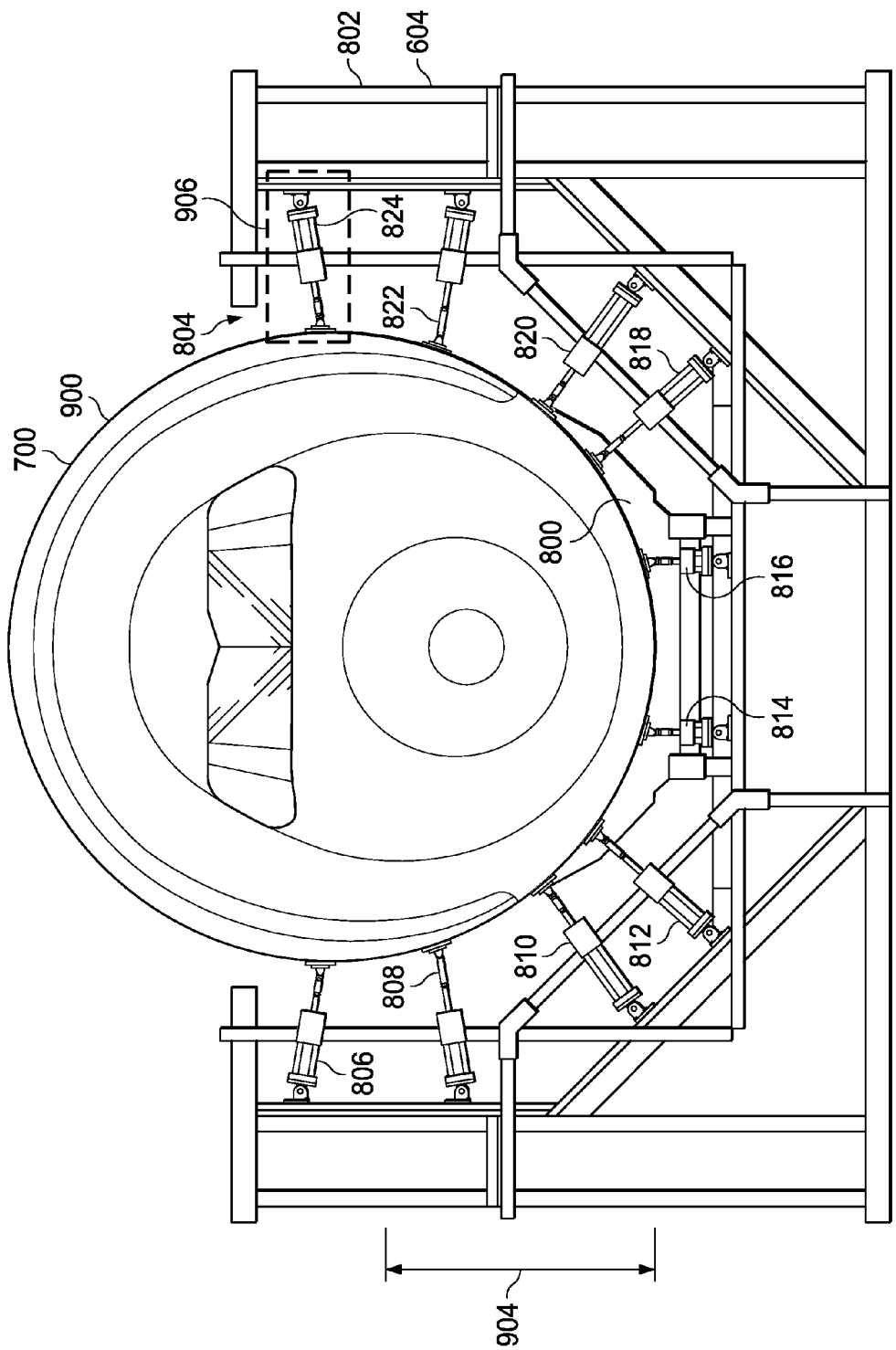
FIG. 9 is an illustration of a view of a first cradle in accordance with an illustrative embodiment.

With reference next to FIG. 9, an illustration of a view of a first cradle is depicted in accordance with an illustrative embodiment. In this illustrative example, first cradle 604 holding first fuselage section 700 is a shown in the direction of arrows 9-9 in FIG. 7. In this example, first fuselage section 700 is held on holding structure 800. While held on holding structure 800, actuators 804 may apply forces to first fuselage section 700 to change the current shape of first fuselage section 700 towards a desired shape for first fuselage section 700.

In this illustrate example, actuators 804 apply forces to a portion of first fuselage section 700. As depicted, actuators 804 apply forces to a portion of first fuselage section 700 that is about one half of circumference 900 of first fuselage section 700. In this particular example, the forces are applied to lower half 904 of first fuselage section 700 resting on holding structure 800. A more detailed illustration of actuator 822 in section 906 is shown in FIG. 10 below.

Figure 10:
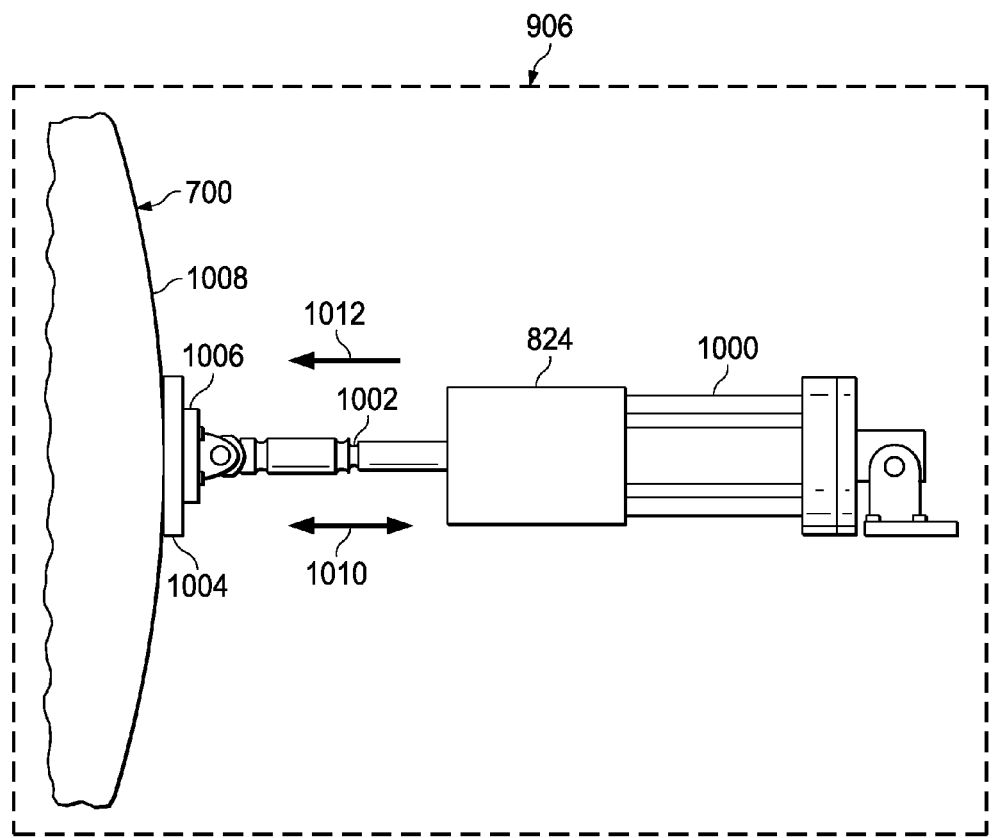
FIG. 10 is an illustration of an actuator in accordance with an illustrative embodiment.

Turning now to FIG. 10, an illustration of an actuator is depicted in accordance with an illustrative embodiment. A more detailed illustration of actuator 824 in section 906 is shown in this figure.

As depicted, actuator 824 is a linear actuator. Actuator 824 is associated with frame 802 (not shown in this view) and positioned to apply a force on first fuselage section 700.

In this illustrative example, actuator 824 includes motor 1000 and linear member 1002. Motor 1000 may take various forms depending on the particular implementation. For example, motor 1000 may be electrical, hydraulic, pneumatic, or some other type of motor. Linear member 1002 has foot 1004 at end 1006 that contacts surface 1008 of first fuselage section 700.

Linear member 1002 in actuator 824 may move in the direction of arrow 1010. Actuator 824 applies force in the direction of arrow 1012 in this example.

Figure 11:
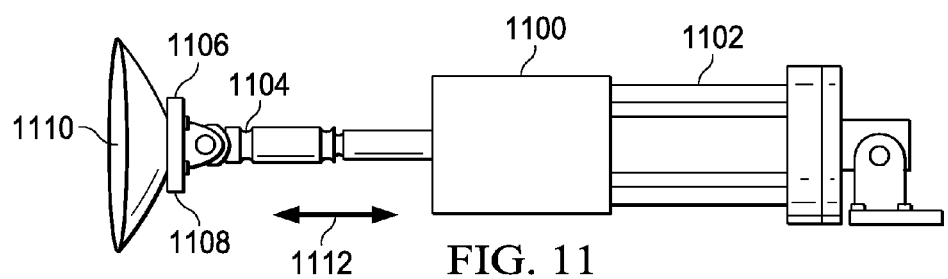
FIG. 11 is another illustration of an actuator in accordance with an illustrative embodiment.

With reference now to FIG. 11, another illustration of an actuator is depicted in accordance with an illustrative embodiment. In this example, actuator 1100 is an example of another actuator that may be used in actuators 804 in FIG. 8. As depicted, actuator 1100 is a linear actuator. Actuator 1100 has motor 1102 and linear member 1104.

Actuator 1100 has foot 1106 at end 1108 of linear member 1104. In this example, foot 1106 has a suction cup 1110. With suction cup 1110, foot 1106 may apply force in the direction of arrow 1112. In other words, actuator 1100 may push or pull on a structure. Arrow 1112 shows that the force may be applied in two directions in contrast to the single direction of actuator 824 in FIG. 10.

Figure 12:
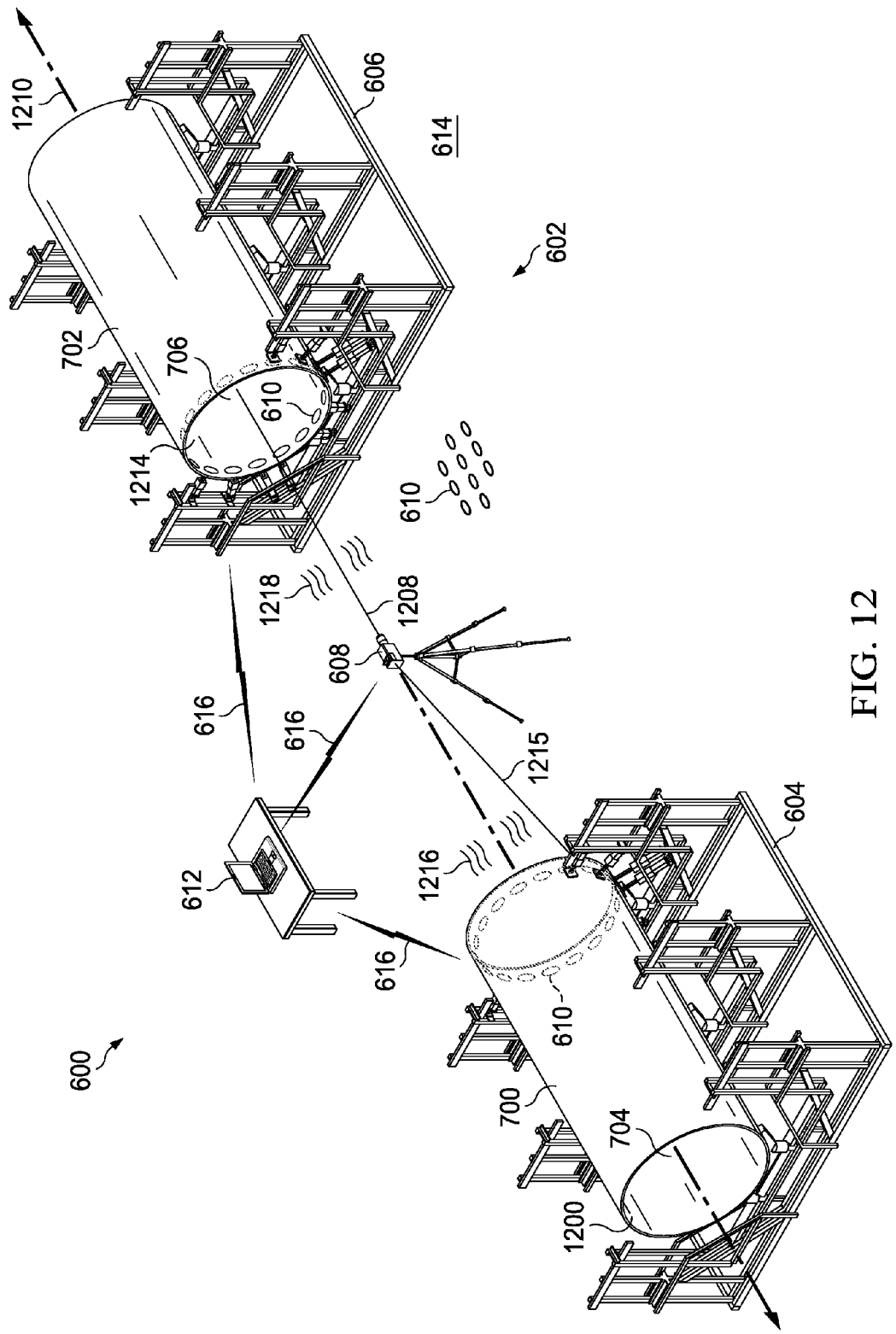
FIG. 12 is an illustration of a metrology system setup in accordance with an illustrative embodiment.

With reference next to FIG. 12, an illustration of a metrology system setup is depicted in accordance with an illustrative embodiment. In this particular example, laser tracker 608 is positioned relative to first fuselage section 700 to make measurements of the shape in interior 1200 of first fuselage section 700.

As shown in this illustrative example, first fuselage section 700 is held in first cradle 604 and second fuselage section 702 is held in second cradle 606. First fuselage section 700 and second fuselage section 702 are positioned such that axis 1210 extends substantially centrally through the interior of first fuselage section 700 and second fuselage section 702.

In this example, a portion of targets 610 are attached to interior surface 704 of first fuselage section 700 as shown in phantom. Another portion of targets 610 are attached to interior surface 706 of second fuselage section 702. Laser tracker 608 sends signals in the form of laser beam 1215 towards the portion of targets 610 attached to interior surface 704 in interior 1200 of first fuselage section 700. Laser tracker 608 also sends laser beam 1208 towards the portion of targets 610 attached to interior surface 706 in interior 1214 of second fuselage section 702. Laser tracker 608 detects response signals to the laser beams in the form of reflected light 1216 and reflected light 1218. In this manner, laser tracker 608 may make measurements of first fuselage section 700 and second fuselage section 702 sequentially, or both first fuselage section 700 and second fuselage section 702 at the same time.

The illustration of fuselage manufacturing system 602 in aircraft manufacturing environment 600 in FIG. 6-12 is not meant to imply limitations to the manner in which other illustrative examples may be implemented. For example, other illustrative examples may use other numbers of actuators. In other illustrative examples, five, fifteen, twenty-four or some other number of actuators may be used. Also the positioning of the actuators may vary in other illustrative examples. For example, the actuators may apply force over a portion that is 50 percent, 80 percent, or another portion of the circumference of a fuselage section.

As another example, axis 1210 may not be used to align first fuselage section 700 and second fuselage section 702. Other positions for these fuselage sections may be used and axis 1210 does not pass through the fuselage sections centrally. The fuselage sections may be in any position where laser tracker 608 is able to make measurements of the fuselage sections.

The different components shown in FIGS. 6-12 may be combined with components in FIGS. 1-5, used with components in FIGS. 1-5, or a combination of the two. Additionally, some of the components in FIGS. 6-12 may be illustrative examples of how components shown in block form in FIGS. 1-12 can be implemented as physical structures.

Figure 13:
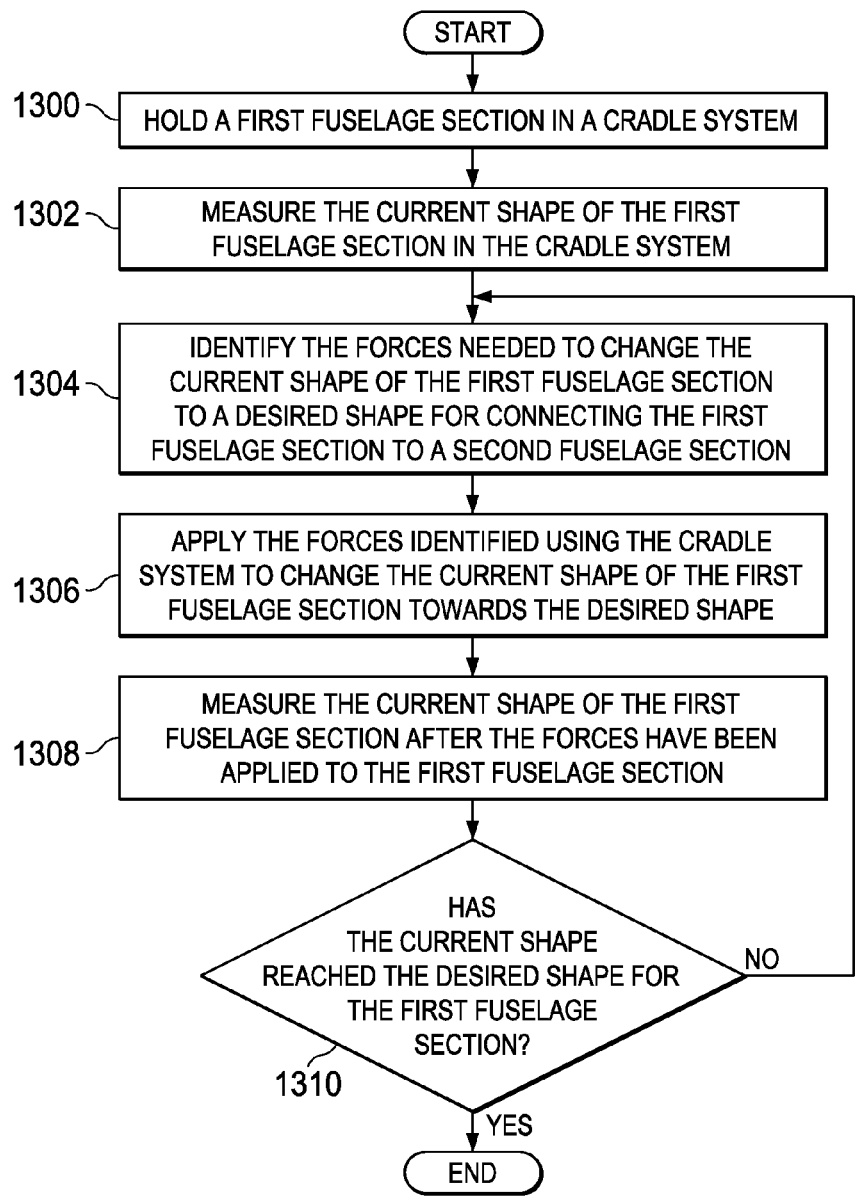
FIG. 13 is an illustration of a flowchart of a process for processing fuselage sections in accordance with an illustrative embodiment.

Turning next to FIG. 13, an illustration of a flowchart of a process for processing fuselage sections is depicted in accordance with an illustrative embodiment. The process in FIG. 13 may be implemented in aircraft manufacturing environment 100 to process fuselage sections 103. In particular, the different operations may be implemented using fuselage manufacturing system 102 in FIG. 1.

The process begins by holding a first fuselage section in a cradle system (operation 1300). The process then measures the current shape of the first fuselage section in the cradle system (operation 1302).

The process identifies the forces needed to change the current shape of the first fuselage section to a desired shape for connecting the first fuselage section to a second fuselage section (operation 1304). In identifying the forces, the process may identify a difference between the current shape of the first fuselage section and the desired shape for the first fuselage section using at least one of a metrology system or a controller. This difference may then be used to identify forces needed to make a change in the shape of the first fuselage section. The process then applies the forces identified using the cradle system to change the current shape of the first fuselage section towards the desired shape (operation 1306).

The process then measures the current shape of the first fuselage section after the forces have been applied to the first fuselage section (operation 1308). A determination is made as to whether the current shape has reached the desired shape for the first fuselage section (operation 1310).

If the current shape has reached the desired shape, the process terminates. Otherwise the process returns to operation 1304. This process may repeat operation 1304, operation 1306, operation 1308, and operation 1310 as many times as needed to reach the desired shape for the first fuselage section. The operations form a feedback loop for actively changing the current shape of the first fuselage section.

Further, different operations in FIG. 13 may be applied to a second fuselage section. These operations may be applied to the first fuselage section and a second fuselage section, sequentially, or about the same time.

For example, the process may hold the second fuselage section in the cradle system and measure a second current shape of the second fuselage section. The process may also identify the forces needed to change at least one of the first current shape of the first fuselage section towards the first desired shape or a second current shape of the second fuselage section to a second desired shape for connecting the first fuselage section to second fuselage section. Further, the process may apply the forces to change at least one of the first current shape of the first fuselage section towards the first desired shape or the second current shape of the second fuselage section towards the second desired shape.

Figure 14:
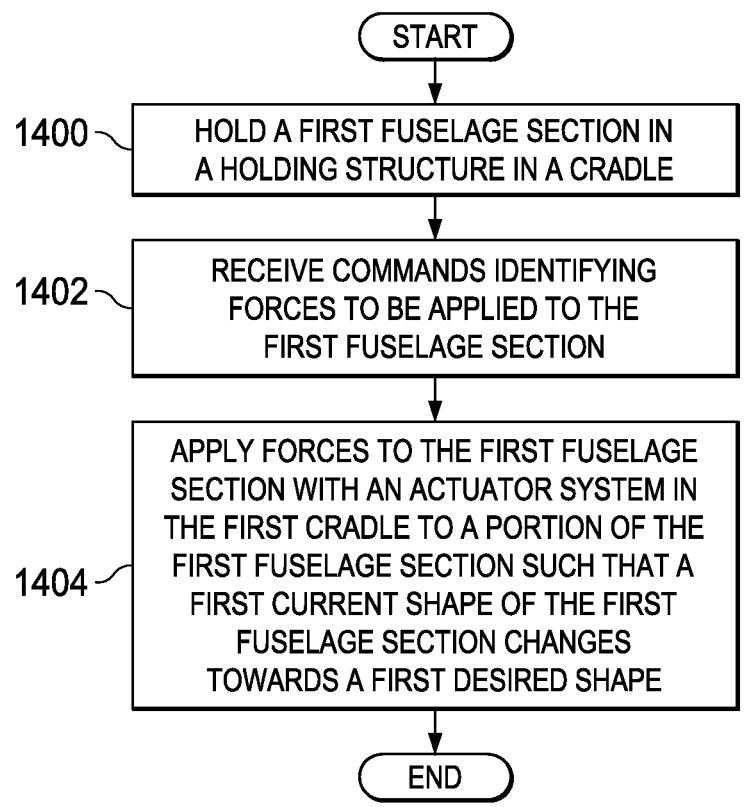
FIG. 14 is an illustration of a flowchart of a process for applying forces to a fuselage section in accordance with an illustrative embodiment.

With reference next to FIG. 14, an illustration of a flowchart of a process for applying forces to a fuselage section is depicted in accordance with an illustrative embodiment. The process illustrated in FIG. 14 may be implemented in an aircraft manufacturing environment 100 in FIG. 1. In particular, the processes may be implemented using cradle 202 in cradle system 108 as shown in FIG. 2.

The process begins by holding a first fuselage section in a holding structure in a cradle system (operation 1400). Next, the process receives commands identifying forces to be applied to the first fuselage section (operation 1402).

The process then applies forces to the first fuselage section with an actuator system in the first cradle to a portion of the first fuselage section such that a first current shape of the first fuselage section changes towards a first desired shape (operation 1404). The first desired shape is a shape for the fuselage section that is desired for joining the first fuselage section to a second fuselage section.

Figure 15:
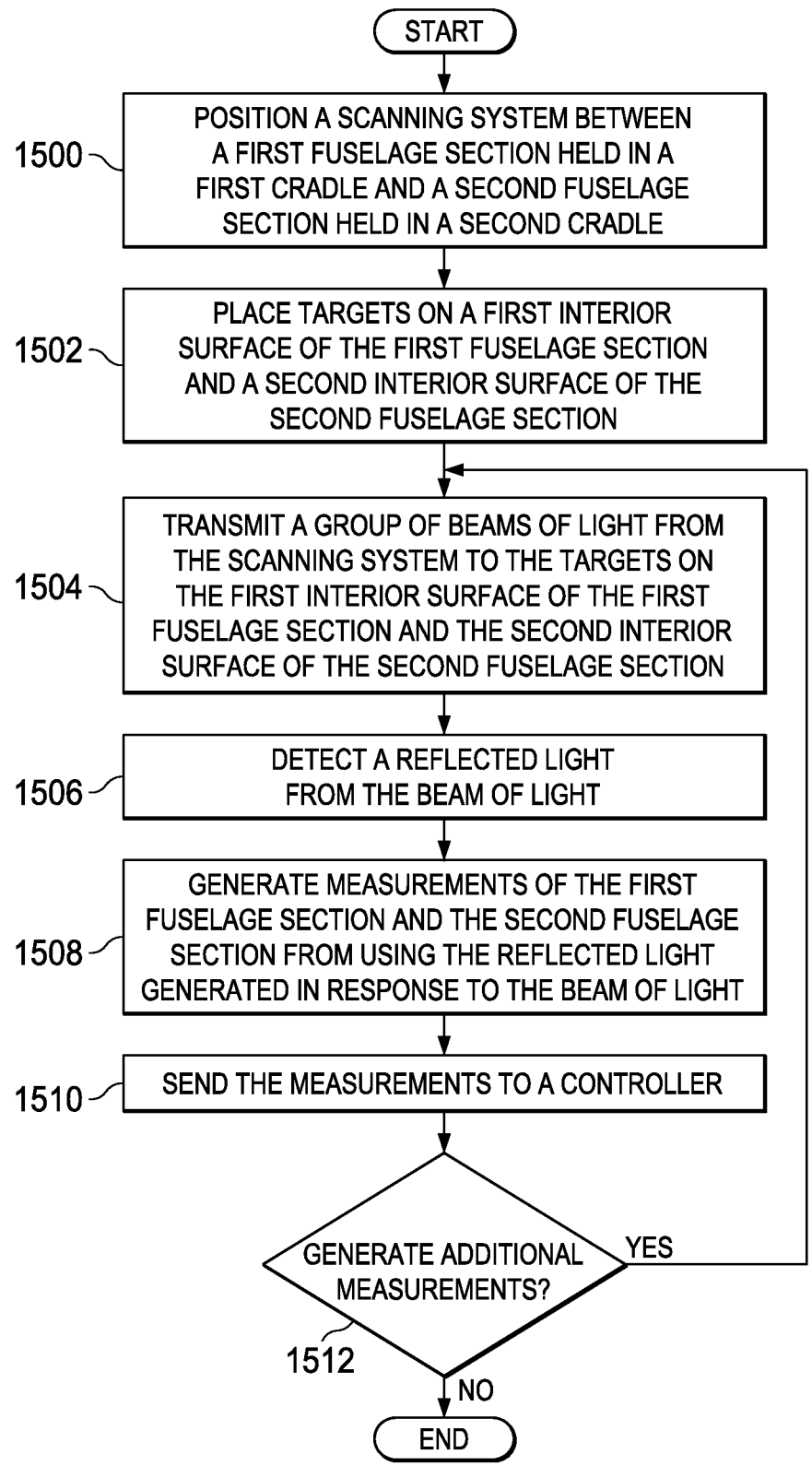
FIG. 15 is an illustration of a flowchart of a process for generating measurements of fuselage sections using a metrology system in accordance with an illustrative embodiment.

Turning to FIG. 15, an illustration of a flowchart of a process for generating measurements of fuselage sections using a metrology system is depicted in accordance with an illustrative embodiment. The process illustrated in FIG. 15 may be implemented using metrology system 110 as depicted in FIG. 3. In this example, scanning system 310 and targets 312 in metrology system 110 are used to generate measurements of two fuselage sections.

The process begins by positioning a scanning system between a first fuselage section held in a first cradle and a second fuselage section held in a second cradle (operation 1500). The positioning of the scanning system may be performed by moving at least one of the scanning system, the first cradle, or the second cradle. The positioning is such that the scanning system is able to transmit signals, such as a group of beams of light to targets on at least one of the first fuselage section or the second fuselage section.

The process then places targets on a first interior surface of the first fuselage section and a second interior surface of the second fuselage section (operation 1502). The process then transmits a group of beams of light from the scanning system to the targets on the first interior surface of the first fuselage section and the second interior surface of the second fuselage section (1504). The process detects a reflected light from the beam of light (operation 1506).

The process then generates measurements of the first fuselage section and the second fuselage section from using the reflected light generated in response to the beam of light (operation 1508). In this illustrative example, the measurements may be the dimensions for the current shape of the first fuselage section and second fuselage section. In other illustrative examples, the measurements may be a difference between a current shape and a desired shape for the fuselage sections. In yet other illustrative examples, both of these types of measurements may be generated.

The process the sends the measurements to a controller (operation 1510). The controller uses these measurements to determine whether the force should be applied and what types of forces should be applied to the fuselage sections.

A determination is made as to whether to generate additional measurements (operation 1512). For example, additional measurements may be made each time a current shape of the first fuselage section is changed. If additional measurements are to be generated, the process returns to operation 1504. Otherwise the process terminates. The measurements enable shaping at least one of the first fuselage or the second fuselage for joining the first fuselage to the second fuselage.

Figure 16:
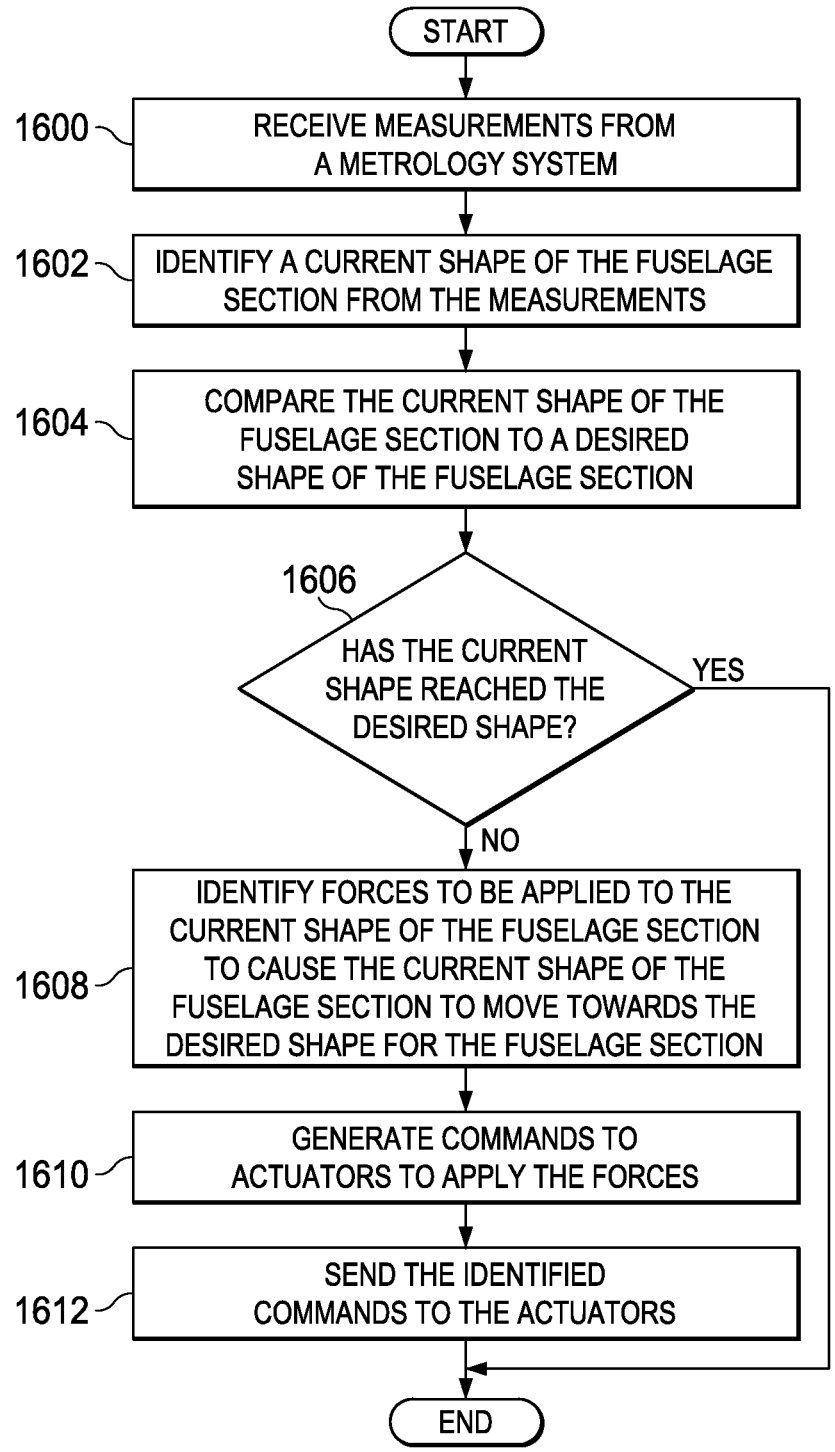
FIG. 16 is an illustration of a flowchart of a process for identifying forces for changing the shape of a fuselage section in accordance with an illustrative embodiment.

With reference next to FIG. 16, an illustration of a flowchart of a process for identifying forces for changing the shape of a fuselage section is depicted in accordance with an illustrative embodiment. The process illustrated in FIG. 16 may be implemented in a controller, such as controller 112 in FIG. 1.

The process begins by receiving measurements from a metrology system (operation 1600). The process then identifies a current shape of the fuselage section from the measurements (operation 1602). The process then compares the current shape of the fuselage section to a desired shape of the fuselage section (operation 1604). This comparison may be made by using a model of the desired shape for the current fuselage section or a model of the current shape of a second fuselage section to which the fuselage section being processed is to be joined.

A determination is made as to whether the current shape has reached the desired shape (operation 1606). If the current shape has reached the desired shape, the process terminates.

Otherwise, the process identifies forces to be applied to the current shape of the fuselage section to cause the current shape of the fuselage section to move towards the desired shape for the fuselage section (operation 1608). In operation 1608, the forces may be identified using various models. For example, a finite element model of the fuselage section may be used to identify changes in the current shape of the fuselage section in response to the application of forces. Forces are selected to identify whether these changes cause the current shape of the fuselage section to move towards the desired shape. These forces may be selected using various techniques. For example, at least one of an artificial intelligence program, a knowledgebase, an expert system, or some other technique may be used to identify the forces.

Once the forces are identified, the process generates commands to actuators to apply the forces (operation 1610). The process then sends the identified commands to the actuators (operation 1612), with the process terminating thereafter. The process in FIG. 16 may be repeated each time measurements are received from a metrology system.

Turning now to FIG. 17, an illustration of a flowchart of a process for joining fuselage sections is depicted in accordance with an illustrative embodiment. The process illustrated in FIG. 17 may be implemented in aircraft manufacturing environment 100 in FIG. 1 to join fuselage sections to each other. This process may be used when the two fuselage sections have a desired shape for joining the two fuselage sections to each other.

The process begins by positioning the first fuselage section relative to the second fuselage section (operation 1700). This positioning is performed with fuselage sections that have been changed in shape using the process illustrated in FIG. 13.

The process then joins the first fuselage section with the first desired shape to the second fuselage section with the second desired shape (operation 1702) with the process terminating thereafter. In operation 1702, the joining of the first fuselage section with the second fuselage section may be made using different types of techniques. For example, the two fuselage sections may be joined using at least one of a butt joint, a splice joint, or some other suitable mechanism.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 1502 and operation 1504 may be performed in reverse order. In another example, operation 1502 and operation 1504 may be performed at substantially the same time.

As another illustrative example, measurements may be made in a single fuselage section rather than to fuselage sections in the process illustrated in FIG. 15. In yet other illustrative examples, the process may be applied to measurements being made for three or more fuselage sections. In this type of implementation, additional laser trackers may be placed between fuselage sections.

In still another illustrative example, operation 1502 in FIG. 15 may be omitted in some illustrative examples. The placing of the targets may be omitted, for example, when the targets are features on the fuselage sections.

The illustrative embodiments of the disclosure may be described in the context of aircraft manufacturing and service method 1800 as shown in FIG. 18 and aircraft 1900 as shown in FIG. 19. Turning first to FIG. 18, an illustration of an aircraft manufacturing and service method is depicted in the form of a block diagram in accordance with an illustrative embodiment. During pre-production, aircraft manufacturing and service method 1800 may include specification and design 1802 of aircraft 1900 in FIG. 19 and material procurement 1804.

During production, component and subassembly manufacturing 1806 and system integration 1808 of aircraft 1900 in FIG. 19 takes place. Thereafter, aircraft 1900 in FIG. 19 may go through certification and delivery 1810 in order to be placed in service 1812. While in service 1812 by a customer, aircraft 1900 in FIG. 19 is scheduled for routine maintenance and service 1814, which may include modification, reconfiguration, refurbishment, and other maintenance or service.

Each of the processes of aircraft manufacturing and service method 1800 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of an aircraft is depicted in the form of a block diagram in which an illustrative embodiment may be implemented. In this example, aircraft 1900 is produced by aircraft manufacturing and service method 1800 in FIG. 18 and may include airframe 1902 with plurality of systems 1904 and interior 1906. Examples of systems 1904 include one or more of propulsion system 1908, electrical system 1910, hydraulic system 1912, and environmental system 1914. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 1800 in FIG. 18.

In one illustrative example, components or subassemblies produced in component and subassembly manufacturing 1806 in FIG. 18 may be fabricated or manufactured in a manner similar to components or subassemblies produced while aircraft 1900 is in service 1812 in FIG. 18. As yet another example, one or more apparatus embodiments, method embodiments, or a combination thereof may be utilized during production stages, such as component and subassembly manufacturing 1806 and system integration 1808 in FIG. 18. For example, fuselage sections for aircraft 1900 may be joined to each other to form the fuselage for an aircraft 1900 during component and subassembly manufacturing 1806.

One or more apparatus embodiments, method embodiments, or a combination thereof may be utilized while aircraft 1900 is in service 1812, during maintenance and service 1814 in FIG. 18, or both. For example, during refurbishment of 1900 during maintenance and service 1814, one or more sections of the fuselage may be removed and replaced with new sections that are joined using a fuselage manufacturing system. The use of a number of the different illustrative embodiments may substantially expedite the assembly of aircraft 1900, reduce the cost of aircraft 1900, or both expedite the assembly of aircraft 1900 and reduce the cost of aircraft 1900.

Thus, one or more of the illustrative embodiments provide a method and apparatus for processing fuselage sections to form the fuselage for an aircraft. In one illustrative example, an apparatus includes a cradle system, a metrology system, and a controller. The cradle system holding the fuselage section applies forces to the fuselage section to change the current shape of the fuselage section. The metrology system makes measurements of the current shape of the fuselage section. The controller receives measurements from the metrology system and identifies the forces needed to change the current shape of the fuselage section towards a desired shape for the fuselage section. This desired shape is one that may be used to connect the fuselage section to another fuselage section.

With the apparatus in the different processes performed, joining fuselage sections may be performed more easily and with less labor cost as compared to currently used techniques. With an illustrative example, the fuselage section may be changed using a feedback loop to reach a desired shape for the fuselage section. Further, the number of human operators needed to perform the changes of measurements is fewer than those currently available systems for joining fuselage sections. In this manner, an illustrative example may provide for a better fit between fuselage sections, the reduction in cost in joining fuselage sections, reduced amounts of labor needed to join fuselage sections, or some combination thereof.

With respect to the metrology system, in one illustrative embodiment, a method for measuring fuselage sections is provided. A scanning system is positioned between a first fuselage section held in a first cradle and a second fuselage section held in a second cradle. A group of beams of light is transmitted from the scanning system to targets on a first interior surface of the first fuselage section and a second interior surface of the second fuselage section. A reflected light is detected from a beam of light.

Measurements of the first fuselage section and the second fuselage section are generated from using the reflected light generated in response to the beam of light. The measurements enable shaping at least one of the first fuselage section and the second fuselage section for joining the first fuselage section to the second fuselage section.

The process also places the targets on the first interior surface of the first fuselage section and the second interior surface of the second fuselage section. Also, generating the measurements may comprise identifying a current shape of the first fuselage section and the second fuselage section. In an illustrative example, generating the measurements also may comprise identifying a difference between the current shape of the first fuselage section and a desired shape for the first fuselage section.

In another illustrative example, the current shape is a first current shape and a desired shape is based on at least one of the first current shape of the first fuselage section and a second current shape of the second fuselage section or parameters specified by a design for the first fuselage section. In an illustrative example, the current shape and the desired shape are contours for the first fuselage section.

The process for measuring fuselage sections may include repeating transmitting the group of beams of light from the scanning system to the targets on the first interior surface of the first fuselage section and the second interior surface of the second fuselage section; detecting the reflected light from the group of beams of light; and generating the measurements of the first fuselage section and the second fuselage section from using the reflected light generated in response to the group of beams of light, wherein the measurements enable shaping at least one of the first fuselage section and the second fuselage section for joining the first fuselage section to the second fuselage section each time a current shape of the first fuselage section is changed. In one illustrative example, the scanning system is an optical metrology system and includes at least one of a lidar system or a laser scanning system.

The process also may send the measurements from the scanning system to a controller that identifies forces needed to change a current shape of the first fuselage section to a desired shape for connecting the first fuselage section to the second fuselage section and sends commands to a cradle system to apply the forces to change the current shape of the first fuselage section towards the desired shape. In an illustrative example, the measurements are generated without the scanning system contacting the first fuselage section and the second fuselage section. In an illustrative example, the scanning system and the targets form a metrology system.

In another illustrative embodiment, another method for measuring fuselage sections is provided. A scanning system is positioned between a first fuselage section held in a first cradle and a second fuselage section held in a second cradle. Measurements of the first fuselage section and the second fuselage section are generated using the scanning system. The measurements enable shaping at least one of the first fuselage section and the second fuselage section for joining the first fuselage section to the second fuselage section. In an illustrative example, the process also may place targets on a first interior surface of the first fuselage section and a second interior surface of the second fuselage section. In another illustrative example, the process also may send the measurements from the scanning system to a controller that identifies forces needed to change a current shape of the first fuselage section to a desired shape for connecting the first fuselage section to the second fuselage section and sends commands to a cradle system to apply the forces to change the current shape of the first fuselage section towards the desired shape In generating measurements, the process may transmit a beam of light from the scanning system to targets on a first interior surface of the first fuselage section and a second interior surface of the second fuselage section; detect reflected light from the beam of light; and generate the measurements of the first fuselage section and the second fuselage section from using the reflected light generated in response to the beam of light. In an illustrative example, the scanning system is an optical metrology system and includes at least one of a lidar system or a laser scanning system.

In yet another illustrative embodiment, a metrology system for measuring fuselage sections is provided. The metrology system comprises a scanner that transmits a group of beams of light from the scanning system to targets on a first interior surface of a first fuselage section and a second interior surface of a second fuselage section. The scanner further detects a reflected light from the beam of light and generates measurements of the first fuselage section and the second fuselage section from using the reflected light generated in response to the beam of light. The measurements enable shaping at least one of the first fuselage section and the second fuselage section for joining the first fuselage section to the second fuselage section.

In an illustrative example, the scanner sends the measurements to a controller that identifies forces needed to change a current shape of the first fuselage section to a desired shape for connecting the first fuselage section to the second fuselage section and sends commands to a cradle system to apply the forces to change the current shape of the first fuselage section towards the desired shape. In another illustrative example, the group of beams of light is a group of laser beams. In an illustrative example, the metrology system may further include the targets, wherein the targets are selected from at least one of a reflective tape, a tooling ball, or a feature on one of the first fuselage section and the second fuselage section.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for measuring fuselage sections, the method comprising:
   positioning a scanning system between a first fuselage section held in a first cradle and a second fuselage section held in a second cradle;
   transmitting a group of beams of light from the scanning system to targets on a first interior surface of the first fuselage section and a second interior surface of the second fuselage section;
   detecting, using the scanning system, a reflected light from the group of beams of light;
   generating, using the scanning system, measurements of the first fuselage section and the second fuselage section from using the reflected light generated in response to the group of beams of light;
   shaping, using the first cradle, the first fuselage section based on the measurements; and
   joining, using the first cradle, the first fuselage section to the second fuselage section.

2. The method of claim 1 further comprising:
   placing the targets on the first interior surface of the first fuselage section and the second interior surface of the second fuselage section.

3. The method of claim 1, wherein generating the measurements comprises:
   identifying a current shape of the first fuselage section and the second fuselage section.

4. The method of claim 3, wherein generating the measurements comprises:
   identifying a difference between the current shape of the first fuselage section and a desired shape for the first fuselage section.

5. The method of claim 3, wherein the current shape is a first current shape and a desired shape is based on at least one of the first current shape of the first fuselage section and a second current shape of the second fuselage section or parameters specified by a design for the first fuselage section.

6. The method of claim 4, wherein the current shape and the desired shape are contours for the first fuselage section.

7. The method of claim 1 further comprising:
   repeating transmitting the group of beams of light from the scanning system to the targets on the first interior surface of the first fuselage section and the second interior surface of the second fuselage section; detecting the reflected light from the group of beams of light; and generating the measurements of the first fuselage section and the second fuselage section from using the reflected light generated in response to the group of beams of light, wherein the measurements enable shaping at least one of the first fuselage section and the second fuselage section for joining the first fuselage section to the second fuselage section each time a current shape of the first fuselage section is changed.

8. The method of claim 1, wherein the scanning system is an optical metrology system and includes at least one of a lidar system or a laser scanning system.

9. The method of claim 1 further comprising:
   sending the measurements from the scanning system to a controller that identifies forces needed to change a current shape of the first fuselage section to a desired shape for connecting the first fuselage section to the second fuselage section and sends commands to a cradle system to apply the forces to change the current shape of the first fuselage section towards the desired shape.

10. The method of claim 1, wherein the measurements are generated without the scanning system contacting the first fuselage section and the second fuselage section.

11. The method of claim 1, wherein the scanning system and the targets form a metrology system.

12. A method for measuring fuselage sections, the method comprising:
    positioning a scanning system between a first fuselage section held in a first cradle and a second fuselage section held in a second cradle; and generating, using the scanning system, measurements of the first fuselage section and the second fuselage section using the scanning system;

shaping, using the first cradle, the first fuselage section based on the measurements; and joining, using the first cradle, the first fuselage section to the second fuselage section.

13. The method of claim 12 further comprising:

placing targets on a first interior surface of the first fuselage section and a second interior surface of the second fuselage section.

14. The method of claim 12 further comprising:

sending the measurements from the scanning system to a controller that identifies forces needed to change a current shape of the first fuselage section to a desired shape for connecting the first fuselage section to the second fuselage section and sends commands to a cradle system to apply the forces to change the current shape of the first fuselage section towards the desired shape.

15. The method of claim 12, wherein the generating step comprises:

transmitting a beam of light from the scanning system to targets on a first interior surface of the first fuselage section and a second interior surface of the second fuselage section;

detecting reflected light from the beam of light; and generating the measurements of the first fuselage section and the second fuselage section from using the reflected light generated in response to the beam of light.

16. The method of claim 12, wherein the scanning system is an optical metrology system and includes at least one of a lidar system or a laser scanning system.

17. A metrology system for measuring fuselage sections, the metrology system comprising:

a scanner that transmits a group of beams of light from the scanning system to targets on a first interior surface of a first fuselage section and a second interior surface of a second fuselage section; detects a reflected light from the beam of light; and generates measurements of the first fuselage section and the second fuselage section from using the reflected light generated in response to the beam of light; and a cradle system configured to shape the first fuselage system based on the measurements and join the first fuselage section to the second fuselage section.

18. The metrology system of claim 17, wherein the scanner sends the measurements to a controller that identifies forces needed to change a current shape of the first fuselage section to a desired shape for connecting the first fuselage section to the second fuselage section and sends commands to the cradle system to apply the forces to change the current shape of the first fuselage section towards the desired shape.

19. The metrology system of claim 17, wherein the group of beams of light is a group of laser beams.

20. The metrology system of claim 17 further comprising:

the targets, wherein the targets are selected from at least one of a reflective tape, a tooling ball, or a feature on one of the first fuselage section and the second fuselage section.

* * * * *

UNITED STATES PATENT AND TRADEMARK OFFICE
CERTIFICATE OF CORRECTION

PATENT NO. : 9,453,720 B2
APPLICATION NO. : 14/489057
DATED : September 27, 2016
INVENTOR(S) : Hunt et al.

Page 1 of 1

It is certified that error appears in the above-identified patent and that said Letters Patent is hereby corrected as shown below:

In the Claims

Column 22, Line 6, Claim 17 "the" should be --a--.

Column 22, Line 15, Claim 17 "system" should be --section--.

Signed and Sealed this
Tenth Day of July, 2018

Andrei Iancu
*Director of the United States Patent and Trademark Office*